(12) United States Patent
Hayashida et al.

(10) Patent No.: US 8,223,483 B2
(45) Date of Patent: Jul. 17, 2012

(54) DOCK WITH MOVEABLE CONNECTOR FOR DISPLAY DEVICE

(75) Inventors: Jeff Hayashida, San Francisco, CA (US); Cameron Frazier, San Carlos, CA (US); Emery Sanford, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 286 days.

(21) Appl. No.: 12/652,018

(22) Filed: Jan. 4, 2010

(65) Prior Publication Data

US 2011/0164375 A1    Jul. 7, 2011

(51) Int. Cl.
G06F 1/16    (2006.01)
(52) U.S. Cl. .................................. 361/679.41
(58) Field of Classification Search ............. 361/679.41
See application file for complete search history.

(56) References Cited

U.S. PATENT DOCUMENTS

| | | | | |
|---|---|---|---|---|
| 5,144,290 A * | 9/1992 | Honda et al. | .................. | 345/156 |
| 5,290,178 A * | 3/1994 | Ma | ................. | 439/652 |
| 5,535,093 A * | 7/1996 | Noguchi et al. | ......... | 361/679.43 |
| 5,751,546 A * | 5/1998 | Clark et al. | .............. | 361/679.43 |
| 6,108,200 A * | 8/2000 | Fullerton | ................. | 361/679.12 |
| 6,203,363 B1 | 3/2001 | Yanaura | | |
| 6,366,450 B1 * | 4/2002 | Janicek | ..................... | 361/679.41 |
| 6,683,786 B2 * | 1/2004 | Yin et al. | .................... | 361/679.4 |
| 6,898,080 B2 * | 5/2005 | Yin et al. | .................... | 361/679.41 |
| 6,926,130 B2 | 8/2005 | Skowronski | | |
| 7,014,486 B1 * | 3/2006 | Wu et al. | ...................... | 439/248 |
| 7,352,567 B2 | 4/2008 | Hotelling et al. | | |
| 7,538,792 B2 * | 5/2009 | Takahashi | ................... | 348/207.1 |
| 7,580,255 B2 * | 8/2009 | Crooijmans et al. | ...... | 361/679.56 |
| 2004/0109722 A1 | 6/2004 | Huang | | |
| 2005/0265569 A1 * | 12/2005 | Langberg et al. | ............ | 381/334 |
| 2006/0061958 A1 | 3/2006 | Solomon et al. | | |
| 2006/0187629 A1 * | 8/2006 | Emery et al. | ................... | 361/684 |
| 2006/0250764 A1 | 11/2006 | Howarth et al. | | |
| 2006/0274910 A1 * | 12/2006 | Schul et al. | ................... | 381/334 |

(Continued)

FOREIGN PATENT DOCUMENTS

| | | |
|---|---|---|
| GB | 2 127 235 A | 4/1984 |
| GB | 2 351 187 A | 12/2000 |
| GB | 2 433 845 A | 7/2007 |
| WO | WO 2005/047052 A | 5/2005 |
| WO | WO 2008/061040 A2 | 5/2008 |
| WO | WO 2009/024749 A1 | 2/2009 |

OTHER PUBLICATIONS

International Search Report from PCT/US2010/061577, dated Apr. 28, 2011 (10 pages). International Search Report from PCT/US2009/052664, dated Nov. 4, 2009 (7 pages).

Primary Examiner — Lisa Lea Edmonds
(74) Attorney, Agent, or Firm — Kilpatrick Townsend & Stockton LLP

(57) ABSTRACT

Docking stations with a moveable connector that is more durable are provided. For example, when a portable electronic device, coupled with the connector, is pushed forward, the connector is designed to move (e.g. rotate), thereby reducing an impact of strain resulting from such a push. The rotatable connector may be biased to keep the portable electronic device in an upright position such that the electronic device is supported by a rear reference surface of the docking station, thereby preventing undue strain on the rotatable connector in the upright position and inhibiting movement forward. The rotatable connector may be partly below an outer shell of the docking station, and pivot at the outer shell, thereby reducing possible damage to parts below the outer shell. The rotatable connector may also retract when rotated, thereby removing a force that can break the connector at a position of full rotation forward.

24 Claims, 9 Drawing Sheets

U.S. PATENT DOCUMENTS

| | | |
|---|---|---|
| 2006/0285710 A1 | 12/2006 | DeVesto |
| 2007/0035917 A1* | 2/2007 | Hotelling et al. ............. 361/683 |
| 2007/0073952 A1 | 3/2007 | Tsai et al. |
| 2007/0230723 A1 | 10/2007 | Hobson et al. |
| 2007/0273327 A1 | 11/2007 | Daniel et al. |
| 2008/0259550 A1 | 10/2008 | Lien |
| 2009/0009957 A1 | 1/2009 | Crooijmans et al. |
| 2010/0062615 A1* | 3/2010 | Prest ............................... 439/38 |
| 2010/0158297 A1* | 6/2010 | Stuczynski .................. 381/332 |

\* cited by examiner

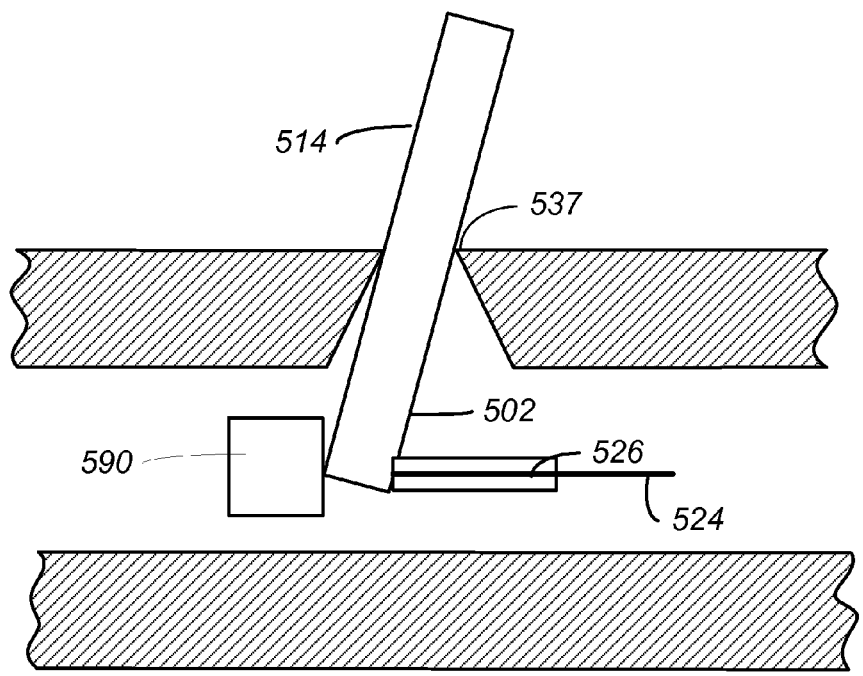
FIG. 5A
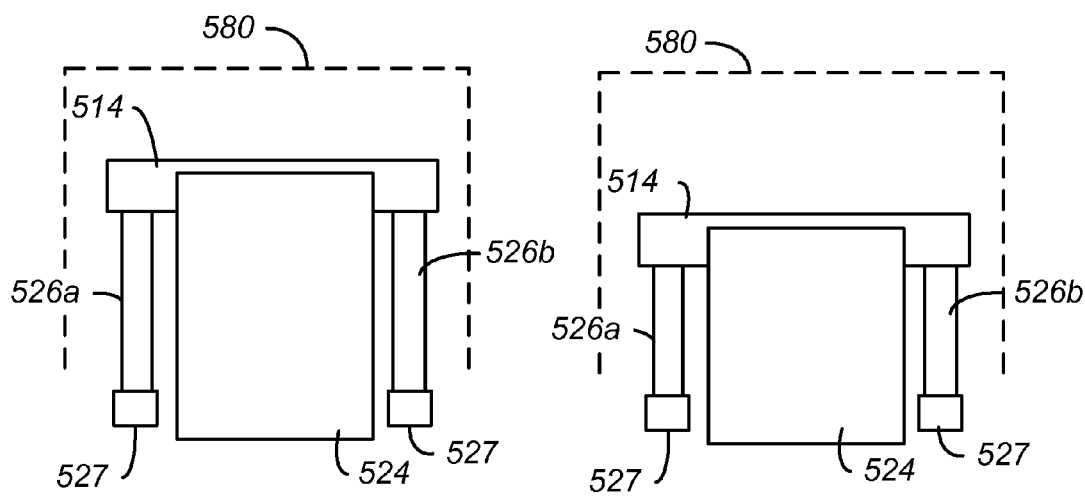
FIG. 5B    FIG. 5C

DOCK WITH MOVEABLE CONNECTOR FOR DISPLAY DEVICE

BACKGROUND

The present invention relates to a docking station for an electronic device. More particularly, the present invention relates to a docking station having a connector that is more durable.

Portable electronic devices (such as phones, media players, notebook/netbook computers, tablet computers) are becoming ubiquitous in today's society. Portable electronic devices commonly have display screens (e.g. a touch screen) on which users view and/or select data and functionality. For example, a user may select a video or other presentation to watch. In such circumstances, it is more convenient for the user to have the device in an upright (viewable) position by placing the device in some sort of holder so the user is not forced to hold the device during viewing.

Additionally, users would like to interface the display devices with other electronics. For example, a user may want to play music through speakers, or simply charge the device. However, during such interfacing or charging, the user would still like to be able to view the display and/or controls of the device.

To provide such features, manufacturers provide docking stations (docks) in which a user can plug the device. Often the docks will have a connector rising out from a surface, with the connector being in a position such that the device can be viewed and/or used. However, connectors can be weak points, especially when devices become large and additional stresses are placed on the connector. The connector may also provide most of the support of the device. Accordingly, the connectors of such docking stations can be damaged by misuse, e.g. being pulled in improper direction.

SUMMARY

Embodiments of the present invention provide docking stations with a connector that is more durable. Some embodiments allow the connector to move when connected to a portable electronic device. This movement of the connector can absorb undesirable forces, thereby reducing a likelihood of the connector breaking from misuse. Examples of movement include sliding, translation, flexures, rotation and/or some combination thereof. In one example, if the portable electronic device is pushed forward, the connector can rotate, thereby reducing the likelihood of breakage from such a push.

Additionally, the rotatable connector may be biased with a biasing mechanism to keep a portable electronic device in an upright position such that the electronic device is supported by a rear reference surface of the docking station, thereby preventing undue strain on the rotatable connector in the upright position. The biasing mechanism can act by opposing movement forward to keep the electronic device in a position to be supported by the rear reference surface. The rotatable connector may be partly below and partly above an outer shell of a base of the docking station, and pivot at the outer shell of the base, thereby reducing possible damage to parts (e.g. a rotation mechanism) below the outer shell. The rotatable connector may also retract when rotated, which can remove the connector from the device, and thus can stop the force from acting on the connector.

According to one embodiment, a docking station can include a base, a rear reference surface, and a rotatable connector that is configured to receive and electrically couple to a receptacle connector of a portable electronic device. The rotatable connector can be coupled to the base and biased toward an upright position. The rear reference surface can be mechanically coupled to the base and adapted to support the portable electronic device when the electronic device is coupled to the rotatable connector in its upright position.

According to another embodiment, a docking station can include a base with an outer shell having an opening and a rotatable connector that is configured to receive and electrically couple to a receptacle connector of a portable electronic device. The rotatable connector can be coupled to the base and protrudes through the opening in the outer shell of the base. The rotatable connector can have a first section below the outer shell and a second section above the outer shell. During at least a portion of a rotation, the rotatable connector pivots about a point of contact between a surface of the rotatable connector and the outer shell.

According to yet another embodiment, a docking station can include a base with an outer shell having an opening and a rotatable connector that is configured to receive and electrically couple to a receptacle connector of a portable electronic device. The rotatable connector protrudes through the opening in the outer shell such that the rotatable connector has a first section below the outer shell and a second section above the outer shell. The docking station also includes at least one guide post coupled with the rotatable connector and at least one guiding surface that is in contact with the at least one guide post. The at least one guiding surface guides a position of the rotatable connector during rotation of the rotatable connector.

According to yet another embodiment, a docking station includes a base, rotatable connector (configured to receive and electrically couple to a receptacle connector of a portable electronic device), and a retraction mechanism. The base has a bottom surface and a top outer shell that has an opening. The rotatable connector protrudes through an opening in the top outer shell such that the rotatable connector has a first section below the top outer shell and a second section above the top outer shell. The retraction mechanism causes the second section of the rotatable connector that is above the outer shell to decrease as the rotatable connector rotates from a position perpendicular to the bottom surface towards a front of the docking station.

BRIEF DESCRIPTION OF THE DRAWINGS

FIG. 3A shows the connector is shown in an upright position. FIG. 3B shows the connector rotated fully forward (counterclockwise as shown).

FIG. 5A shows a cross-sectional side view of a rotatable connector that has a biasing mechanism and an electronic connection according to an embodiment of the present invention.

FIGS. 5B and 5C show a bottom view of the connector, biasing mechanism, and electrical connection of FIG. 5A according to an embodiment of the present invention.

DETAILED DESCRIPTION

Embodiments of the present invention provide a docking station (dock) that provides a connector that is more durable. Such durability can be accomplished, in part, by allowing the connector to move so that the connected portable electronic device does not put a significant amount of force on the connector. For example, with limited reference surfaces (surfaces that can touch the electronic device when it is connected with the connector), a joint of a fixed connector may weaken if the portable electronic device is forced off its attachment/detachment axis. Such a force may occur inadvertently when a user reaches for the device. The force of the push and/or the force of the weight of the device, which may weaken the joint, instead simply moves the connector.

In one embodiment, for example, the connector may be configured to rotate relative to the dock base in order to better distribute the forces when an off axis force is applied, i.e., it moves with the force rather than completely resisting the force by not moving. Other features, which help to provide a more durable connector, include a rear reference surface of the docking station that supports the portable electronic device when the connector is in an upright position, a pivot mechanism that protects certain moving parts by keeping them within the base of the dock, and a retraction mechanism that can help discharge the connector from the portable electronic device prior to the connector rotating all the way forward also help to provide a more durable connector. The exact motion of the connector and forces from any biasing mechanism can be tuned to provide a desired motion and feel when a user moves the electronic device.

As used herein, a portable electronic device is of such size and proportion that it may be carried in the hand(s) of a person. Examples of portable electronic devices include but are not limited to media players that play or otherwise transmit audio and/or visual (video or picture) signals (e.g., iPod) and phones that allow users to communicate remotely through wireless connections. Portable electronic devices may also correspond to mini-computers, tablet computers, PDAs, internet or email based devices. In fact, portable electronic devices may be a combination of specific or dedicated devices mentioned above (e.g., a smart phone such as the iPhone™), manufactured and sold by Apple Inc. of Cupertino, Calif., the assignee of the present application.

Embodiments of the invention are discussed below with reference to figures. However, those skilled in the art will readily appreciate that the detailed description given herein with respect to these figures is for explanatory purposes as the invention extends beyond these embodiments. For example, embodiments may be used with non-portable devices.

Figure 1:
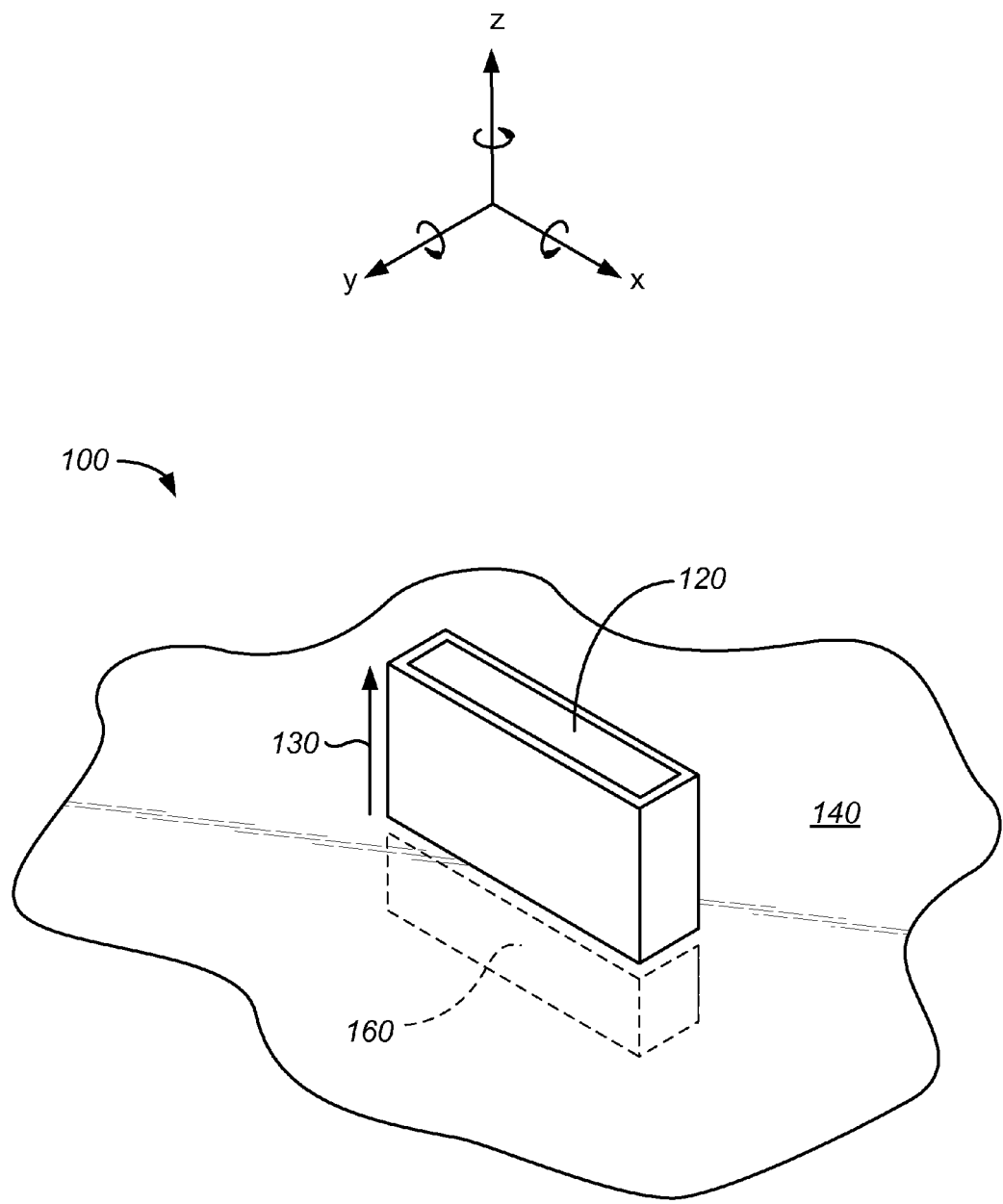
FIG. 1 is a perspective view of a connector assembly 100 according to embodiments of the present invention.

FIG. 1 is a perspective view of a connector assembly 100 according to embodiments of the present invention. The connector assembly 100 includes a connector 120 that protrudes away from a surface 140. The connector 120 generally defines a mating axis 130 along which a corresponding mating connector can be attached and removed. The corresponding mating connector may for example be a connector carried by an electronic device. The connectors can slide on/off along an axis 130 in order to couple and decouple the electrical contacts associated with the connectors.

In one embodiment, connector 120 may be exposed and substantially free from external walls and surfaces (e.g. no or limited walls that surround or are adjacent to the connector). As such, connector 120 may be configured to support electronic devices coupled thereto via a corresponding mating connector with limited or no reference surfaces provided for the electronic device. For example, in one embodiment, connector 120 is not disposed within a recess or cavity and instead extends outward from a surface such that its sides are exposed.

Because connector 120 can be exposed and substantially free from reference surfaces, undesirable off-axis forces may be exerted on connector 120 especially when an electronic device is connected thereon. For example, during a removal event, the electronic device may be rotated, pushed, pulled away from the mating axis thereby imparting undesirable forces on connector 120. By way of example, if mating axis 130 is in the direction of the z axis, undesirable forces may be imparted on the connector by translating the electronic device in x and y as well as rotations about x, y and z axes. In addition, there may even be some forces pulling/pushing on the connector along the z axis due to friction between the mating connectors. A configuration of connector 120 may lead to more susceptible areas of undesirable forces. For example, in cases where connector 120 is wide in x dimension and thin in y dimension (as shown), the connector may be more susceptible to rotations about the x axis.

In order to minimize these types of forces on connector 120 while using limited or no reference surfaces, in one embodiment, connector assembly 100 further includes a force distribution joint 160 that is coupled with connector 120. Force distribution joint 160 may be configured to allow an absorbing of these forces (e.g. by allowing connector 120 to move), especially off-axis forces caused by rotating the electronic device off of connector 120. For example, tilting the electronic device can impart a bending moment on connector 120, which can then tilt in conjunction with force distribution joint 160.

Force distribution joint 160 may be widely varied. In some cases, it may be configured to absorb undesirable forces in specific directions (e.g., rotations about x); while in other cases, it may be configured to absorb undesirable forces in multiple directions (translations in x,y,z and/or rotations about x,y,z). Force distribution joint 160 may for example allow connector 120 to move such that the forces are no longer imparted on a fixed joint, i.e., the forces are distributed.

Force distribution joint 160 can include one or more flexures, rotational mechanisms, translational mechanisms, etc.

In one implementation, force distribution joint 160 may be formed from a compliant or flexible material that yields when undesirable forces are imparted on the connector. For example, foams, springs, and the like may be used. Alternatively or additionally, force distribution joint 160 may be formed from one or more motion mechanisms that yield when undesirable forces are imparted on the connector. For example, pivots, slides and the like may be used. In various embodiments, a bottom section of connector 120 may be embedded in a compliant or flexible material to form force distribution joint 160 or a bottom surface of connector 120 may be attached to the compliant or flexible material to form force distribution joint 160.

In some embodiments, limited reference surfaces may be used in addition to force distribution joint 160. For example, a single reference surface may be used to help guide and support an electronic device, such as a flat portable electronic device (e.g. a phone). The single reference surface may for example help support the back surface of the electronic device. The reference surface may even help position the electronic device in a desired position (e.g., upright or substantially upright viewing position). Unfortunately, the reference surface may instigate unwanted forces. For example, a user may pull the device away from the reference surface during a removal event (thereby causing the connector to rotate). In this particular case, force distribution joint 160 may be especially geared to absorb these rotational forces. In one example, force distribution 160 joint may allow connector 120 to rotate in the direction away from the reference surface.

It should be appreciated that force distribution joint 160 can be tuned or dampened to provide a desired counter force to the undesirable force. For example, springs may be used to help bias the connector in a direction against the direction of the undesirable forces (e.g., off-axis forces). It should also be appreciated that force distribution joint 160 may be hidden from view as for example within or underneath the surface 140 (as shown by dotted lines).

In one embodiment, surface 140 may be a top surface of a docking station to which the electronic device is designed to be coupled. Such a docking station can provide a platform for quickly and easily coupling a portable electronic device to another system or device as for example a computer, a power source, or peripheral devices such as a monitor, a keyboard, speakers, etc. The docking station can also hold the electronic device in a position suitable for viewing a display of the electronic device.

Docking stations may be a stand-alone unit that communicates with other devices or systems through wired (e.g., cables) or wireless (e.g., Bluetooth) connections, or alternatively, a docking station may be integrated directly into the other devices or systems. In one embodiment, connector 120 may be connected to other electronics housed within the docking station via a flexible or movably-enabled connection, such as swiping contacts, wires, traces, flexible circuits and/or the like. Some of these examples may include slack so that the connector can move between positions. The electronics may be widely varied. The electronics may for example include circuit boards, controllers, connectors, and the like. The electronics can be fixed within the body or configured to be movable to help manage the connection between the electronics and connector 120, as connector 120 moves. For example, a printed circuit board may slide along rails. Certain embodiments are described in more detail below.

Connector 120 may be coupled to other connectors, ports, jacks, transceivers, or cables of the docking station, thereby providing external connections to the other devices or systems. In the case of an integrated docking station, connector 120 may be wired directly to the components of the host device or system. In some cases, connector 120 is substantially on its own while in other cases the connector may be part of a module that includes a secondary structure, such as a housing.

In various embodiments, connector 120 can correspond to USB, Firewire, or other standardized connector formats. In one example, connector 120 is a 30-pin connector compatible with the Apple iPod® and iPhone™ devices. In an embodiment, the 30-pin connector has a long thin low profile (as shown) with spaced apart side by side pins, which may be in a single row. In one embodiment, the electronic device can have a female connector receptacle connector that connects with connector 120, which may be a male connector plug. In alternative embodiments, the electronic device can have a male connector receptacle that connects with a female connector plug of a dock. In this embodiment, the female receptacle may be situated in a housing.

Moveable connector 120 may move between a closed position and one or more open positions for engaging a corresponding connector of the electronic device. In one embodiment, the corresponding connector is incapable of engaging connector 120 in the closed position. In some cases, the connector movement may be a combination of different movements such as for example translation and rotation. For example, connector 120 may rotate forward from the upright position while sliding to be placed in a closed position.

In the closed position, connector 120 may be at least partially within the confines of the docking station and in some cases entirely within the confines of the docking station. Connector 120 may be housed in a recess or void or cavity in the docking station when connector 120 is in the closed position. In some cases, the arrangement may provide a substantially flush surface on the top surface 140 when connector 120 is in the closed position. In addition, in some arrangements, connector 120 may even be hidden from view.

In the upright position, on the other hand, connector 120 may extend outward from surface 140. This may be beneficial in that connector 120 may need to be completely or partly exposed outside of the body in order to connect with certain devices. As used herein, the term "upright position" includes any position of connector 120 in which a user can use a device when connected to connector 120. Although the term upright position may be a single position, in some cases, it may refer to a plurality of upright positions. For example, connector 120 may have multiple upright positions that place the connector at different orientations/locations/distance away from the body. These positions may be at a number of designated points.

A docking station according to embodiments of the present invention may also include a biasing mechanism, which be part of or separate from force distribution joint 160. The biasing mechanism may be configured to keep connector 120 in an upright position (where the device can be supported and available for viewing). The biasing mechanism may, for example, include a spring (any object with a spring constant) that continuously biases connector 120 toward an upright position. A locking mechanism can keep connector 120 in a closed position. The lock may, for example, be released via a button positioned on the docking station, which when activated allows the biasing mechanism to move connector 120 to an upright position. Once released, connector 120 may be repositioned within the body by simply forcing connector 120 back into surface 140 against the spring force until the lock reengages connector 120. In one embodiment, detents may be used to hold, or at least stabilize, connector 120 in various upright positions. In embodiments where connector 120 rotates, the biasing mechanism can also prevent connector 120 from rotating past an end point (e.g. full rotation forward) where connector 120 does not rotate any further.

Regarding embodiments where a movement of connector 120 is rotation, connector 120 moves using a rotation mechanism that links the connector and a body of the dock together. In one example, force distribution joint 160 can be the rotation mechanism. In one embodiment, connector 120 can pivot at surface 140 with other parts of the rotation mechanism protected underneath surface 140. In another embodiment, connector 120 and the rotation mechanism may be formed into a single integral unit. The amount of rotation that is provided may vary and can depend on the desired orientation of the electronic device when it is docked, and/or other features of the dock. For example, the amount of rotation can permit the electronic device to be placed in a substantially upright position (exposing its display and/or user interface). The rotation mechanism can include gears, cams, followers, and the like.

FIGS. 2A-2E show a cross-sectional side view of a docking station 200 according to an embodiment of the present invention. As mentioned above, docking stations such as docking station 200 can provide a platform for quickly and easily coupling an electronic device 212 to another system or device as for example a computer, a power source, or peripheral devices such as a monitor, a keyboard, speakers, etc. Docking station 200 can also hold electronic device 212 in a position suitable for viewing a display 213 of the electronic device.

Docking station 200 may include a base 230, which may contain various electronics, ballast, and the like. Base 230 can serve to keep docking station 200 balanced and supported on a surface such as a table, as well as keep electronic device 212 balanced and supported when mounted thereto. Docking station 200 may also provide one or more reference surfaces for helping support the electronic device in an upright position. In the illustrated embodiment, docking station 200 can include a rear reference surface 240 that protrudes upwardly from base 230 and that helps define the desired position of electronic device 212 when electronic device 212 is mounted to docking station 200. For example, the back surface of electronic device 212 contacts with rear reference surface 240. In some cases, additional reference surfaces may be provided. For example, one or more side support members may help mate the connector of electronic device 212 with connector 214.

The angle of rear reference surface 240 may generally define the angle of the electronic device when mounted. The angle may for example be about 0-30 degrees and more particularly between about 10 and 15 degrees. Rear reference surface 240 may be widely varied. For example, it may consist of one or more rear support members that are coupled to base 230. Base 230 and the rear support members may be formed as a single integral unit or they may be separated parts that are attached together. In most cases, the base and rear support members are fixed to one another. However, it is contemplated that the position of the rear support members may be adjustable relative to the base (thereby enabling multiple positions for viewing or even a retracted position for travelling). In some cases, the rear support members may be detachable from base 230. The length of the rear support members generally correspond to that which is required to properly support the electronic device in an upright position. In some cases, it may extend higher than electronic device 212 while in other cases it may extend below electronic device 212 (as shown). Of course, it may even have a similar length such that the top edge are about the same height. In some cases, the rear support members may be height adjustable so that different devices can be supported by docking station 200.

Docking station 200 may include at least one connector 214. Connector 214 may protrude upwardly from base 230 and may be configured to interface with a corresponding connector(s) of the electronic device when the electronic device is positioned relative to the docking station and more particularly the rear reference surface. In some embodiments, connector 214 can be partly within an interior of base 230 and protrude through an opening 215 in an exterior surface. In other embodiments, rotatable connector 214 can be completely above an exterior surface. The connector may protrude upwardly at an angle similar to the rear support members. As such, rear reference surface 240 may be used as a reference surface during placement of the electronic device relative to the connector. The connectors may for example interface along an axis 205. That is, they may be coupled/decoupled to/from each other along axis 205. Axis 205 provides the direction into which the contacts of the connector mate with one another.

In one embodiment, connector 214 may be rotatably coupled to base 230 via a rotation mechanism (not shown). Connector 214 can for example rotate between the upright position (FIG. 2B) that is substantially parallel to the rear support member and various rotated positions (FIGS. 2C and 2D) that are angled away from the upright position. The rotation mechanism can allows electronic device 212 to rotate forward from an upright position (which may be used for viewing a display) to other positions when electronic device 212 is forced forward as for example in a removal or inadvertent knock event. As a result, undue stress on the connector is reduced or prevented, which over time may lead to failure at the joint of connector 214.

The rotation mechanism may be widely varied. In some embodiments, the rotation mechanism can include a pivot such as a cylindrical or other shaped rod that can be attached to, or be part of, the bottom of connector 214 and that interfaces with pivot holes in the base (or vice versa). As examples, the rod may attach to a side of base 230 or rest on or within a cavity that holds the rod while allowing the rod to rotate. In another embodiment, the rotation is about an edge at an outer shell of base 230.

Docking station 200 may also include biasing mechanism 226, which biases connector 214 to reside in an upright position. In the embodiment shown, biasing mechanism 226 is a spring (e.g. a solid springy material such as rubber or similar synthetic materials) that pushes back with greater force when its length is made shorter. In another embodiment, biasing mechanism 226 pulls connector 214 to reside in an upright position when its length is made longer. In one aspect, at least one part (e.g., the end farther from the connector) of biasing mechanism 226 is held into place, such that at least one dimension of the biasing mechanism is reduced when the bottom of connector 214 moves to the right. Biasing mechanism 226 may use various spring materials to tune and dampen the motion of connector 214 as it rotates forward. An operation of biasing mechanism according to one embodiment is discussed further below, e.g., with relation to FIGS. 3A and 3B.

Docking station may also include connection 224 configured to electrically couple the connector with the electronics 222. Connection 224 may provide an electrical connection from contacts at the bottom end of the connector 214 to electronics 222, which may be a data and/or power connector. For example, connection 224 may be a flexible member that provides some slack to enable movement of the connector.

The flexible member may for example be a ribbon cable or a flexible circuit, which is not always taught. Alternatively, swiping contacts may be used.

Figure 2A:
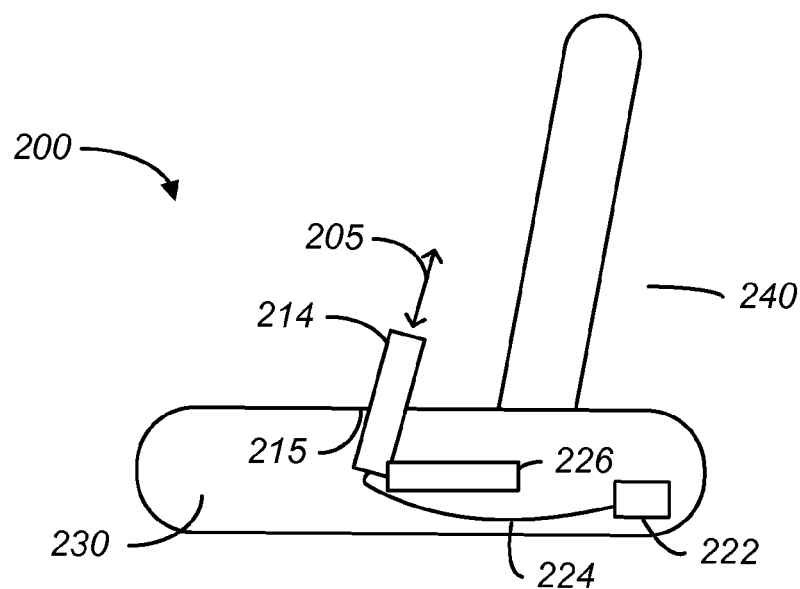
FIG. 2A shows a cross sectional side view of a docking station with a rotatable connector that is biased in an upright position according to an embodiment of the present invention.
Figure 2B:
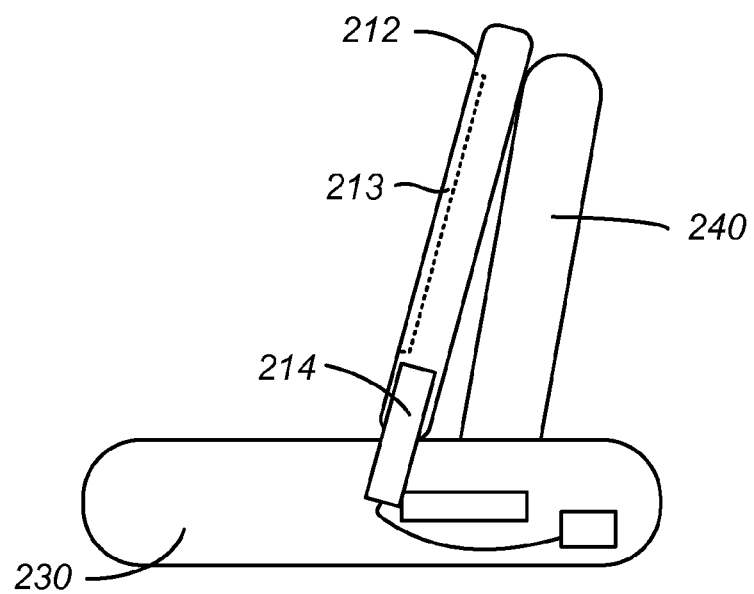
FIG. 2B shows the docking station coupled with a portable electronic device that is supported by a rear reference surface when the rotatable connector is in an upright position according to an embodiment of the present invention.

To elaborate, FIG. 2B shows the docking station 200 coupled with a portable electronic device 212 that is supported by back 240 when rotatable connector 214 is in an upright position according to an embodiment of the present invention. As shown, rotatable connector 214 is configured to receive a receptacle connector of portable electronic device 214. Contacts at the top end of connector 214, which are part of or are electrically coupled with the contacts at the bottom end of connector 214, may couple connection 224 to the receptacle connector, thereby providing electrical connection between receptacle and electronics 222.

As shown, rear reference surface 240 is adapted to support portable electronic device 212 when the electronic device is coupled to rotatable connector 14 in its upright position. In one embodiment, rear reference surface 240 supports portable electronic device 212 prior to rotatable connector 14 reaching its full rotation backward (clockwise as shown). In another embodiment, rear reference surface 240 supports portable electronic device 212 when it is fully rotated backward. Rear reference surface 240 can support the weight of the connected portable electronic device 212 so that this weight does not continue to put a force on connector 214, e.g., when device 212 is being viewed. In this manner, strain on connector 214 can be reduced, and connector 214 can be more durable.

Although strain on connector 214 in the backward direction can be reduced by rear reference surface 240, there may be instances where portable electronic device 212 is inadvertently pushed or moved forward. For example, when attempting to remove portable electronic device 212 from docking station 200, a user might knock portable electronic device 212 forward. Such motion could put strain on the connector 214. However, since the connector 14 can rotate forward, such a strain can be reduced or potentially eliminated when the force is first applied.

Figure 2C:
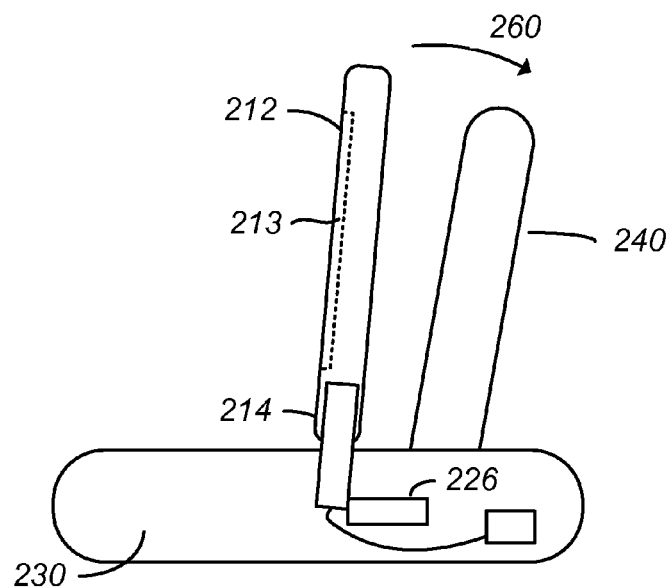
FIG. 2C shows the docking station connected to the rotatable connector where the portable electronic device is moved forward relative to the rear reference surface according to an embodiment of the present invention.
Figure 2D:
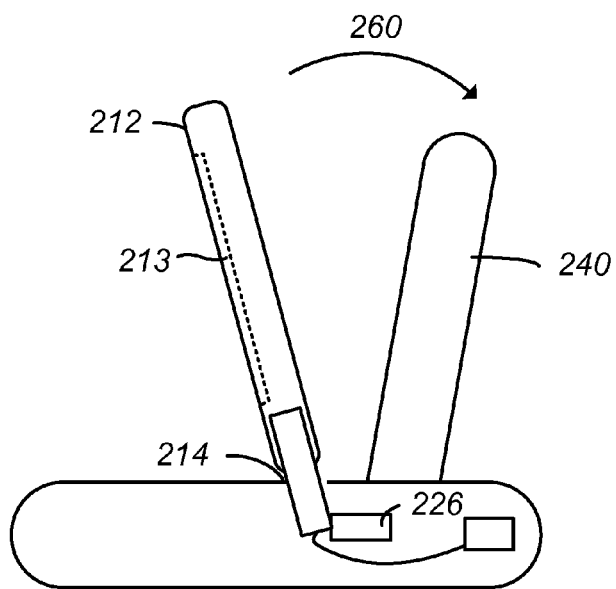
FIG. 2D shows the docking station connected to the rotatable connector where the portable electronic device is moved past a vertical position according to an embodiment of the present invention.

Biasing mechanism 226 can ensure that connector 214 is in the proper location such that electronic device 212 is supported by rear reference surface 240 once attached. Biasing mechanism 226 can also provide an opposing force that makes it easier to attach device 212. Additionally, when device 212 is moved forward, biasing mechanism 226 can provide a force to return device 212 against the rear reference surface 240. Otherwise, device 212 may fall forward, which could break connector 214. FIGS. 2C and 2D illustrate such a biasing force.

FIG. 2C shows docking station 200 connected to rotatable connector 214 where portable electronic device 214 is moved forward relative to the rear reference surface 240. For example, device 212 may have been pushed or pulled forward as a user's hand is grabbing for the device. As shown, device 212 no longer rests against rear reference surface 240.

As device 212 has moved forward, biasing mechanism 226 provides a force 260 that pushes the connector 14 backward (clockwise as shown). In one aspect, this force 260 may be strong enough to counteract the counterclockwise (i.e. forward) force on the connector from device 212. Note that the forward force may be of a short duration, e.g., when the device is being lifted up or just slightly nudged. If device 212 is no longer attached, then connector 214 may return to an upright position. If the device is still attached, but the forward force from device 212 is not stronger (or is no longer existing) than the backward force 260, then device 212 may return to resting against rear reference surface 240.

In the embodiment shown, the bottom of connector 214 moves as connector 214 rotates. Counterclockwise rotation of connector 214 pushes its bottom portion against biasing mechanism 226, which causes biasing mechanism 226 to push back to the left with an increasing amount of force as the length of the biasing material (e.g. a spring) decreases. In one embodiment, connector 214 pivots about one or more edges of an outer shell of base 230 during at least a portion of a rotation.

In another embodiment, pivoting of a connector occurs below an outer shell of a base of a docking station, e.g., at the bottom of the connector. In yet another embodiment, pivoting of a connector occurs above a top surface of an outer shell, e.g., when the entire connector is above a top surface of the base. In these embodiments, the connector may have a fixed axis of rotation at a rod that is mechanically coupled to the connector. For example, the rod may pass through a cylindrical hole near the bottom of the connector, or the rod may be attached to a surface of the connector. In various embodiments, the rod can be attached to sides, an inner bottom surface, or an inner top surface of the base so that the rod rotates, but does not translate. In some embodiments, a biasing mechanism can be a curved spring with a first end attached to the base (e.g. at a point forward from the connector) and a second end attached to a surface of the connector. In this manner, when the connector rotates in one direction (e.g. forward), the spring's length decreases as the surface of the connector becomes closer to the point of attachment of the first end and a biasing force backward can be provided. As another example, the biasing mechanism may be a spring that loops around and attaches to the rod that is part of a rotation mechanism. As the rod rotates, the spring deforms, thereby producing a biasing force.

In one aspect, biasing mechanism 226 can prevent device 212 from becoming vertical after a small push forward. For example, if the push has only a small magnitude and is only for a small duration, backward force 260 can prevent the device from rotating past the vertical. As long as the forward rotation is counteracted, the weight of the device and the continued restoring action of backward force 260 can return device 212 to being supported by rear reference surface 240. However, if device 212 moves past the vertical position, then force 260 may need to be increased significantly.

FIG. 2D shows docking station 200 connected to the rotatable connector 214 where portable electronic device 212 is moved past a vertical position. Device 212 is shown in a more forward position than in FIG. 2C. Correspondingly, backward force 260 has increased (as depicted with a larger arc length). In one embodiment, a decrease in the length of biasing mechanism 226 causes force 260 to become larger.

This increase in force 260 may be made to be larger than the component of the weight of the device 212. Thus, if an external force (e.g. from a user's hand) is no longer pushing on the device 212, it may be possible to return the device to an upright position, e.g., where the device 212 is supported by the rear reference surface 240.

In embodiments where connector 214 is partly within an interior of body 230 and where a bottom of connector 214 is allowed to move, connector 214 may have additional features which keep connector 214 from being pulled out of body 230.

Figure 2E:
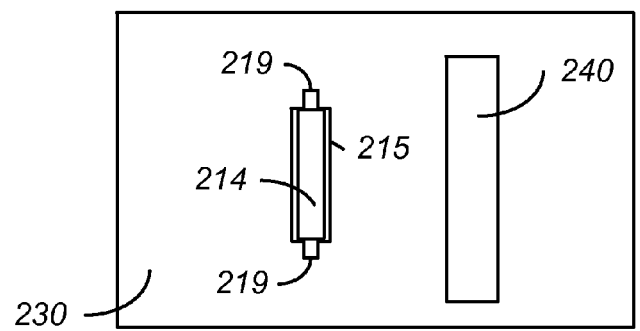
FIG. 2E shows an aerial view of a docking station according to embodiments of the present invention.

FIG. 2E shows an aerial view of docking station 200 according to embodiments of the present invention. Connecter 214 is shown in a substantially vertical position in opening 215 of body 230. One or more restraint members 219 (such as pins, rods, protrusions, or the like) extend from sides of connector 214 past edges of opening 215. Thus, if connector 214 is pulled in upward direction, restraint members 219 prevent connector 214 from being pulled completely out of the interior of body 230. In one embodiment, the downward force on restrain members 219 may be provided by the exterior surface in which the opening 215 resides. In another embodiment, the downward force may be applied by another surface or edge that is between the restraint members and the exterior surface. Restraint members 219 may also be supported below by a surface (which may be a bottom exterior surface of body 230) such that connector 214 does not fall completely within an interior of body 230.

Other features of connector 214 can also extend beyond the edges of opening 215. For example, members may extend forward (left as drawn) or backward (right as drawn) beyond edges of opening 215. In another embodiment, connector 214 may have an angled shape such that a bottom within the interior of body 230 is larger than opening 215.

Besides protecting the connector from damage as forces are applied to connector 214 via device 212, some embodiments protect the rotation mechanism from damage. For example, if the rotation mechanism was exposed, it may be hit or particles may contaminate the rotation mechanism. Additionally, a flat or relatively uniform surface of the base may be desired for functional or aesthetic reasons. To provide these features, embodiments have the rotatable connector pivot at an outer shell of the body.

Figure 3A:
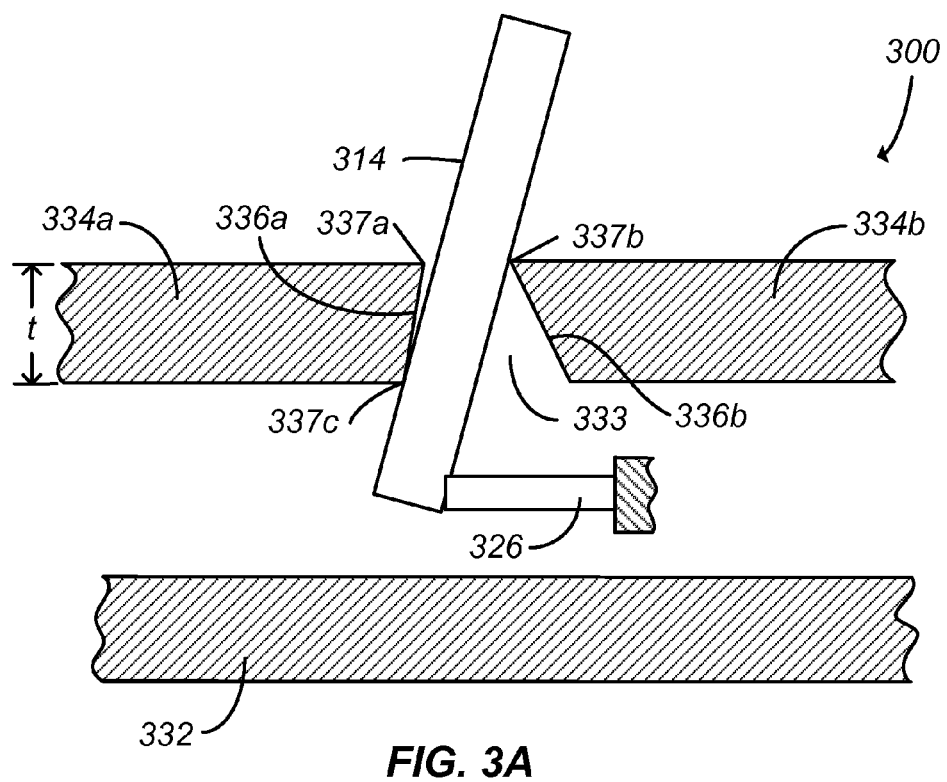
FIGS. 3A and 3B show a magnified cross-sectional view of a rotatable connector that pivots about edges of an outer shell of the docking station according to an embodiment of the present invention.
Figure 3B:
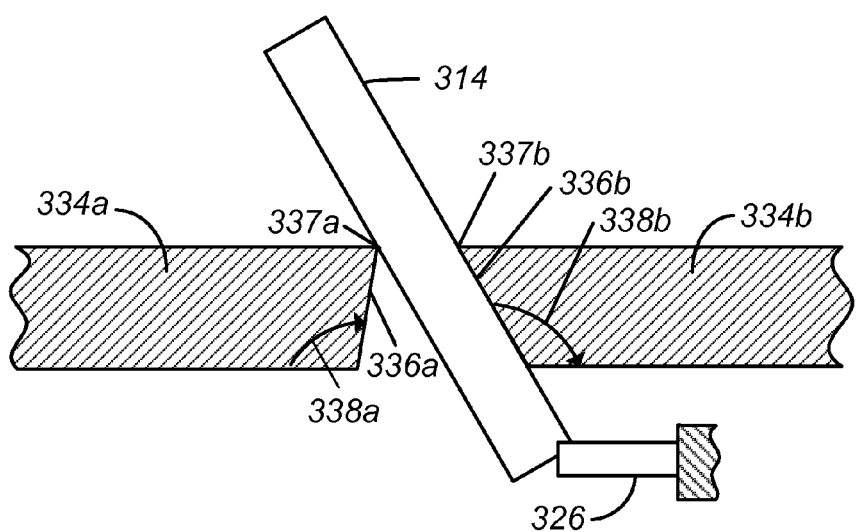

FIGS. 3A and 3B show a cross-sectional side view of a connector assembly 300 according to an embodiment of the present invention. The connector assembly 300 may generally correspond to the system shown in FIGS. 2A-2E. Connector assembly 300 shows a rotation mechanism where a connector pivots about an edge of a body of a docking station.

The connector assembly 300 may include a rotatable connector 314 that is disposed through an opening 333 in an outer shell 334 (such as the upper wall of the base of the docking station). Opening 333 has a shape that enables the rotatable connector 314 to rotate between a nominal upright position (as shown in FIG. 3A) and a tilted position (as shown in FIG. 3B). Outer shell 334 has a section 334a to the left of connector 314 and a section 334b to the right of connector 314. The outer shell is shown to have a thickness (t). The thickness (t) is not drawn to any particular scale, e.g., it could be larger or smaller in relation to the height of connector 314 of height of the base. The base also has a bottom 332, e.g., which can rest upon a supporting surface when the docking station is in use. This bottom surface 332 may be formed integrally with the outer shell 334 and may also have a same thickness t.

When the connector is substantially rotating from tilted position to nominal position the rotatable connector may be configured to pivot about edge 337b of section 334b. When the connector is substantially rotating from the nominal position to the tilted position the rotatable connector may be configured to pivot about the edge 337a of section 334a. In so doing, opening 333 may be sized or dimensioned to be substantially similar to the size of the connector (with minimal gap for tolerance). In this embodiment, the bottom of the connector 314 is allowed to move during its rotation.

In FIG. 3A, connector 314 is shown in an upright position. In one embodiment, a biasing mechanism 326 (which can be similar to biasing mechanism 226 of FIG. 2A) is at or near its relaxed length. In various embodiments, connector 314 may be prevented from further rotation in the backward direction (clockwise as shown), e.g., by an edge 337b, an edge 337c, a surface 336a, or by another object (such as a fixed stop) below the section 334a, or by any combination thereof.

In the position shown in FIG. 3A, connector 314 is prevented from further clockwise rotation by edge 337b of surface 336b and edge 337c of the surface 336a. FIG. 3B shows connector 314 rotated fully in the forward (counterclockwise) direction. As shown in FIG. 3B, connector 314 is now prevented from further counterclockwise rotation by edge 337a of surface 336a and the whole surface 336b. In other embodiments, a bottom portion of surface 336b can act as a stop to prevent the rotation. Having the whole surface 336b act as a stop can provide a larger stopping force and greater durability.

In the embodiment shown, opening 333 in outer shell 334 is large enough that connector 314 is not in contact with both edges 337a and 337b in the fully rotated clockwise position of FIG. 3A. In one aspect, this is because connector 314 can rotate further in counterclockwise direction from the vertical (i.e. perpendicular to the bottom surface 332) than it can clockwise. Surfaces 336a and 336b may have different slopes to allow for such asymmetric range of motion. If connector 314 can rotate the same in both directions, then there may be none or a reduced space between edges 337a, 337b when connector 314 is fully rotated in either direction. At other positions, connector 314 is generally not touching both sections 334a and 334b, and may be touching neither section.

As the bottom of connector 314 is allowed to move backward (to the right as drawn), the top of connector 314 can move to the left (e.g. as a result of the connected portable electronic device 212 moving). Also, as the bottom of connector 314 moves, biasing mechanism 326 also moves, thereby providing a force that tries to move connector 314 back into the upright position in FIG. 3A (although in some embodiments the force may not be strong enough to overcome the force imparted from the portable electronic device).

Accordingly, edges of outer shell 334 can act as pivots during various portions of the rotation of connector 314. Having edges of outer shell 334 acting as a pivot allows the sections 334a and 334b to be close to the connector 314. Thus, opening 333 can be quite small. Having a small opening can prevent dirt, crumbs, or other foreign objects from falling onto the internal components of the base. Additionally, in one embodiment, when connector 314 is in the nominal upright position, a seal can be formed by connector 314 touching edge 337c and edge 337b. Thus, even a liquid may be prevented from entering the dock through opening 333.

In one embodiment, connector 314 can be attached to an edge (e.g. one of edges 337a or 337b), while other embodiments do not have such an attachment. Such attachment may be formed from a hinge or other rotary mechanism and can allow for a fixed axis of rotation in some embodiments, while other embodiments do not have a fixed axis of rotation.

In one embodiment, the amount of rotation allowed can be controlled in part by selecting the angles 338a and 338b of the respective surfaces 336a and 336b. The angles of the surfaces 336a and 336b may be varied. In one embodiment, angle 338a is smaller than angle 338b. In such an embodiment, connector 314 can rotate further in the counterclockwise direction from the vertical position than in the clockwise direction. In another embodiment, the amount of rotation allowed can be controlled in part by the size of the gap between edge 337a and edge 337b.

Also in various embodiments, the bottom of connector 314 can be supported by biasing mechanism 326, a guide surface (e.g. the bottom 332 or another surface between surfaces 334 and 332), notches on sides of the base (e.g. where a rod extending from connector 314 can attach), or other suitable supports. In one embodiment, a guide surface can be relatively flat while in other embodiments a guide surface can have features, e.g., curves or notches for providing different stable upright positions for connector 314.

Figure 4A:
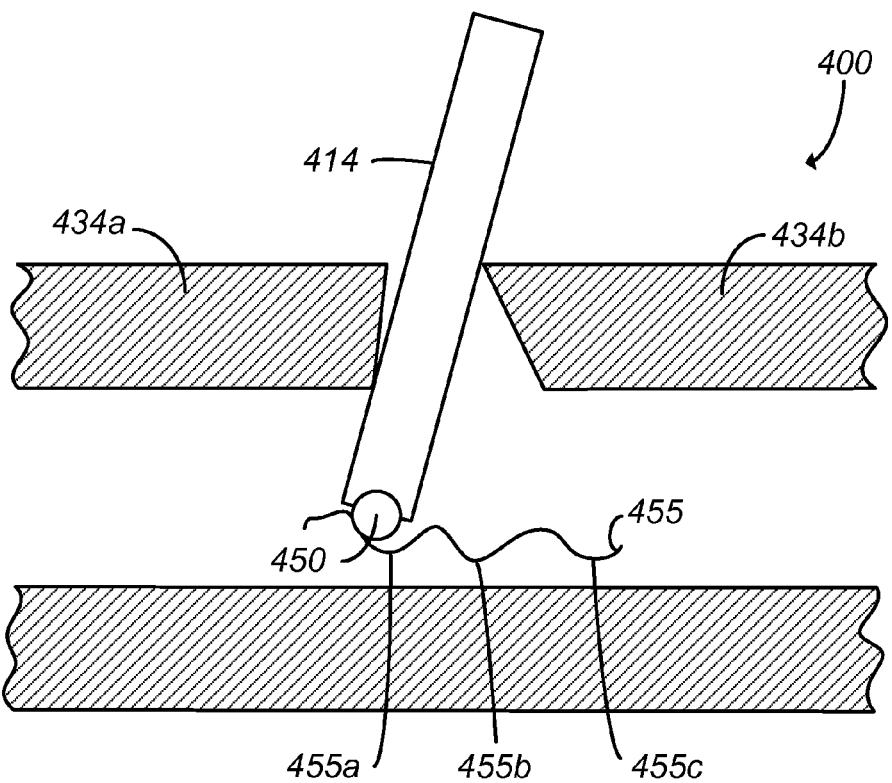
FIGS. 4A and 4B are cross-sectional side views showing a rotatable connector supported by a supporting surface that has a stabilizing feature according to an embodiment of the present invention.
Figure 4B:
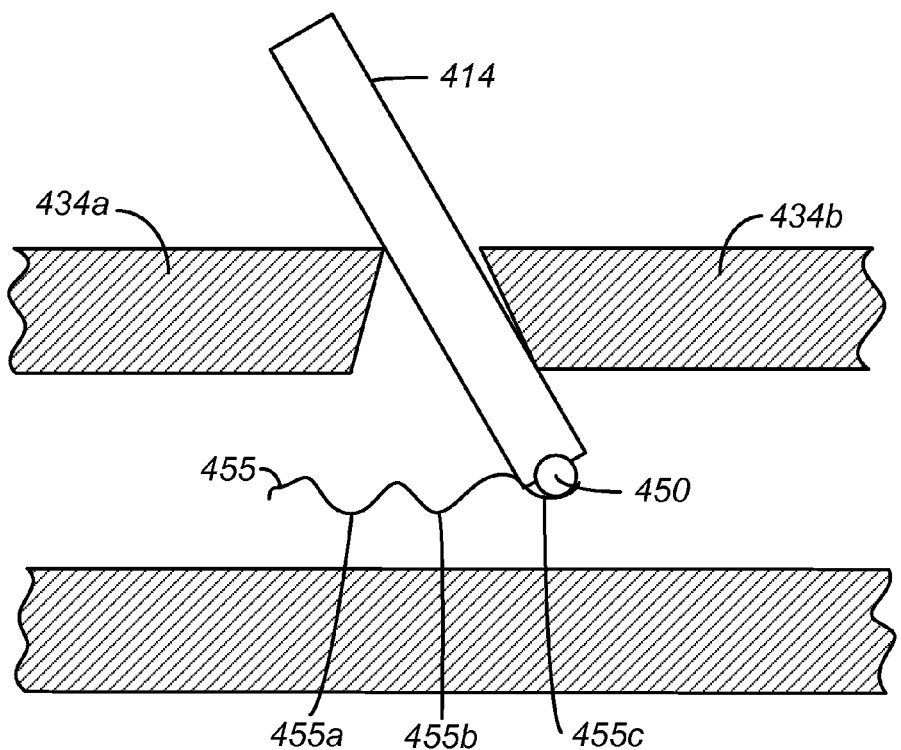

FIGS. 4A and 4B are cross-sectional side views showing a connector assembly 400 according to an embodiment of the present invention. In this embodiment, a rotatable connector 414 may be supported by a supporting surface 455 that has a stabilizing feature(s), which can allow for multiple upright positions. Note that features of different embodiments shown in the figures may be combined with other features of other embodiments shown in other figures. For example, features of the embodiment of FIGS. 4A and 4B may be combined with features of other embodiments (e.g. embodiments shown FIGS. 3A and 3B).

In FIG. 4A, connector 414 has a curved part 450 (e.g. cylindrical) at the bottom which moves along supporting surface 455. Curved part 450 may be a separate piece or formed integrally with the connector 414 (e.g. with a housing of the connector). In one embodiment, curved part 450 can be a wheel that rotates. In another embodiment, curved part 450 slides. In various embodiments, curved part 450 is coupled with just the side edges of connector 414, just coupled with bottom edges of connector 414, or both. For example, supporting (guiding) surface 455 may be two separate surfaces that exist beyond the edges of connector 414, where curved part 450 attaches or extends beyond a side edge of connector 414.

In one embodiment, curved part 450 slides across surface 455. In another embodiment, curved part 450 rotates as it moves along the surface 450, e.g. when curved part 450 is part of a wheel, cylinder, or sphere. Curved part 450 and supporting surface 455 may be or be part of a rotation mechanism that allows connector 414 to rotate. Outer shell sections 434a and 434b or just parts of the outer shell sections 434a and 434b (such as edges and surfaces) may also be part of the rotation mechanism.

Supporting surface 455 may have contours, detents, or other such features to provide different upright positions. For example, in FIG. 4A, curved part 450 sits in a trough 455a of supporting surface 455. As the connector 414 is rotated forward (counterclockwise), the rise in the peak to the right of the trough will oppose such motion. In such embodiments, supporting surface 455 may act as the biasing mechanism or in concert with another biasing mechanism.

As connector 414 rotates under a sufficient force, curved part 450 can move into trough 455b. Trough 455b may act as another detent for holding connector 414 in a different upright position than was achieved by trough 455a. As shown in FIG. 4B, curved part 450 resides in a trough 455c, which roughly corresponds with connector 414 being fully rotated forward as allowed by the shape of sections 434a and 434b of outer shell 434.

Although shown as having 3 troughs in FIGS. 4A and 4B, surface 455 may have more, fewer, or no troughs. Also, the troughs may be at the same height or different heights, e.g., a gradually increasing/decreasing slope. Additionally, supporting surface 455 may continue to increase after trough 455b (or at least flatten out after the peak), and thus would not have a trough 455c that corresponds to the full forward rotation. Having such an increased height of supporting surface 455 at the full rotation can provide a greater biasing force to push connector 414 backward (clockwise).

An electrical connection between the rotatable connector and electronics of the docking station may be configured in various ways, as is mentioned above. In one embodiment, a biasing mechanism and the electrical connection may reside in the same plane. Some of these embodiments are now described.

FIG. 5A shows a cross-sectional side view of a rotatable connector 514 that has a biasing mechanism 526 and an electronic connection 524 according to an embodiment of the present invention. In FIG. 5A, electrical connection 524 and biasing mechanism 526 reside at least partly in a same plane.

This may be accomplished in a variety of different ways. For example, electrical connection 524 could go through the biasing mechanism 526 or be separated laterally.

In this embodiment, electrical connection 524 couples to connector 514 at a back surface 502 of connector 514 (although it is near the bottom of the connector). In other embodiments, connection 524 may be made on a bottom surface of the connector 514.

FIG. 5A also illustrates an embodiment where the amount of rotation can be controlled by a stop 590. A bottom of connector 514 can be in contact with stop 590, which prevents further rotation in the clockwise direction (e.g. backward). In the embodiment shown, connector 514 is pinned between stop 590 and edge 537 so that further rotation in the clockwise direction is prevented.

FIGS. 5B and 5C show a bottom view of the connector 514, biasing mechanism 526, and electrical connection 524 of FIG. 5A according to an embodiment of the present invention. The bottom surface of connector 514 is shown coupled to electrical connection 524. Electrical connection 524 can be a ribbon cable, although the connection may be accomplished in a different manner. An exterior shape 580 of a body of the docking station is provided as a reference to compare the differences in positions between FIGS. 5B and 5C.

Biasing mechanism 526 can include two separate members: a first biasing member 526a and a second biasing member 526b. As one can see, the biasing members 526a,526b rest against connector 514 at positions that are outside the edges of connection 524. Having two biasing members at either side can provide for a more uniform force than having just one. Alternatively, the biasing mechanism can be placed in the middle with two electrical connections at the ends. When the bottom of connector 514 is moved, the back end of biasing mechanism 526 is held in place with fixed elements 527.

FIG. 5B shows connector in a first position (e.g. an upright position). As the connector rotates forward, the bottom of connector 514 moves towards the back of the docking station, as shown in FIG. 5C. This movement along with fixed elements 527 causes the length of biasing members 527 to decrease, which increases a biasing force.

In another embodiment, electrical connection 524 can also act as biasing mechanism 526. For example, connection 524 may be flexible to allow movement of connector 514, but have a stiffness, thereby acting as a spring.

Figure 6A:
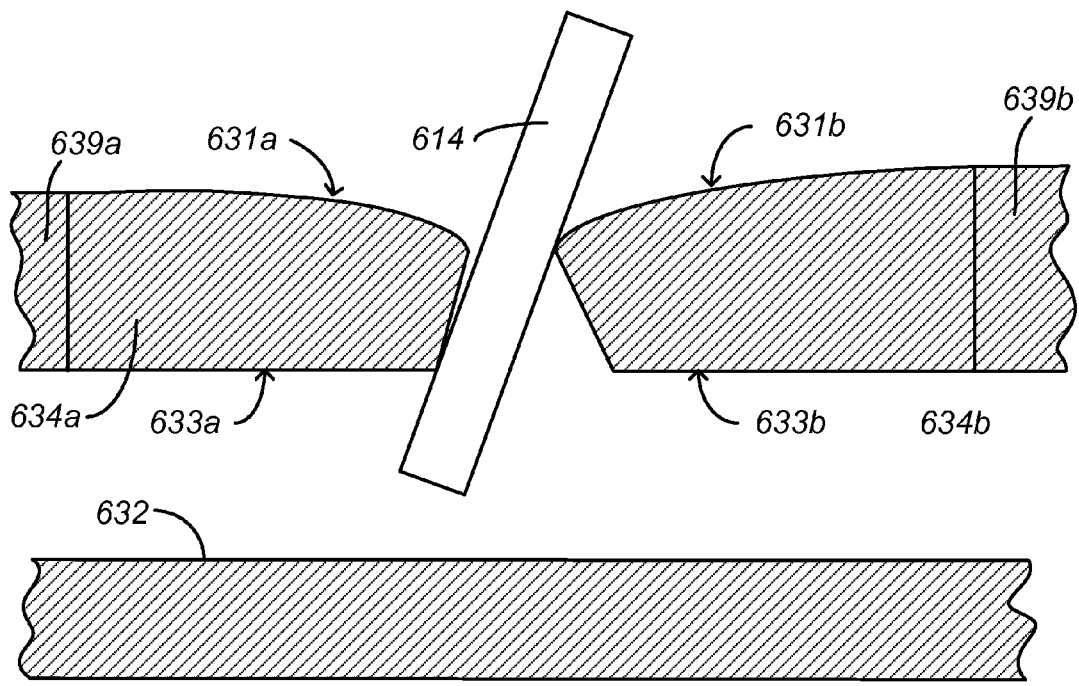
FIGS. 6A and 6B show cross-sectional side views of a rotatable connector that pivots about edges of an outer shell having various shapes according to embodiments of the present invention.
Figure 6B:
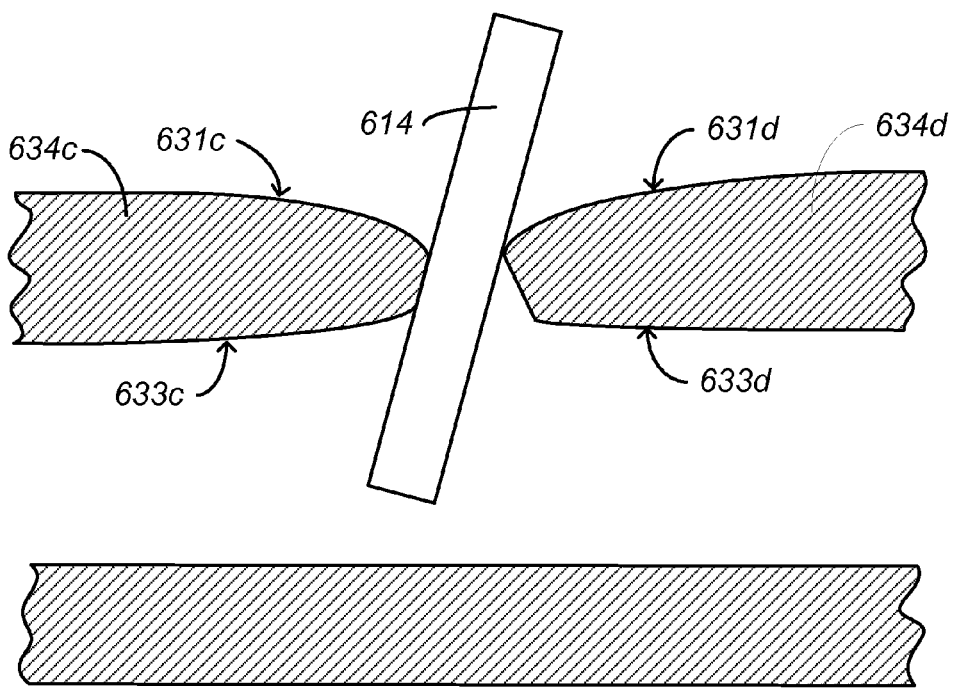

The outer shell of the base of the docking station can have various shapes consistent with embodiments of the present invention. For example, FIGS. 6A and 6B show cross-sectional side views of a rotatable connector 614 that pivots about edges of an outer shell having various shapes according to embodiments of the present invention. In FIG. 6A, outer shell 634 has sections 634a and 634b disposed next to the front and back sides of connector 614, respectively. The left section 634a has a top surface 631a and a bottom surface 633a. The right section 634b has a top surface 631b and a bottom surface 633b.

In FIG. 6A, top surfaces 631a,631b are curved while bottom surfaces 633a,633b are flat. In FIG. 6B, top surfaces 631c,631d have curved surfaces and bottom surfaces 638c and 638d are also curved or otherwise non-flat. In other embodiments, just the bottom surfaces 638c and 638d may be curved.

In the embodiments of FIG. 6A, sections 634a,634b may be formed separately from the rest of the base 639a and 639b, e.g., as a trim that fits into a recess in the base. The part of the outer shell having the opening through which the connector rises of any embodiment mentioned herein may also be composed of a trim that fits into a recess of the base. Additionally, the surfaces and points that contact the connector may have various shapes, as is described below.

Figure 7A:
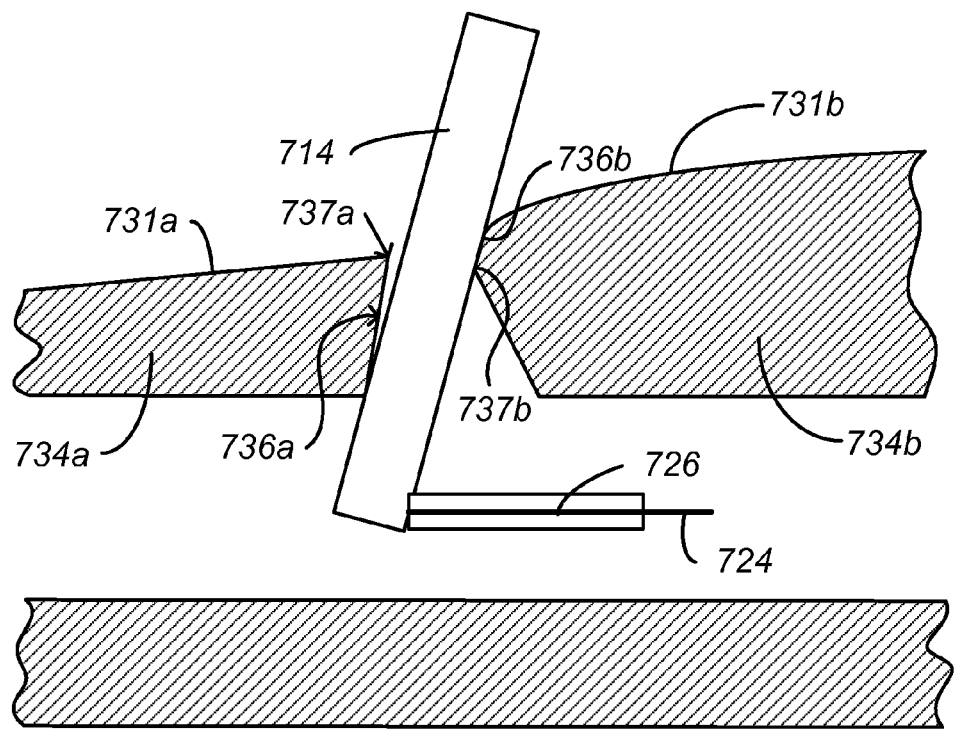
FIGS. 7A and 7B shows cross-sectional side views of a rotatable connector that pivots about edges of an outer shell having the edges at different heights according to an embodiment of the present invention.
Figure 7B:
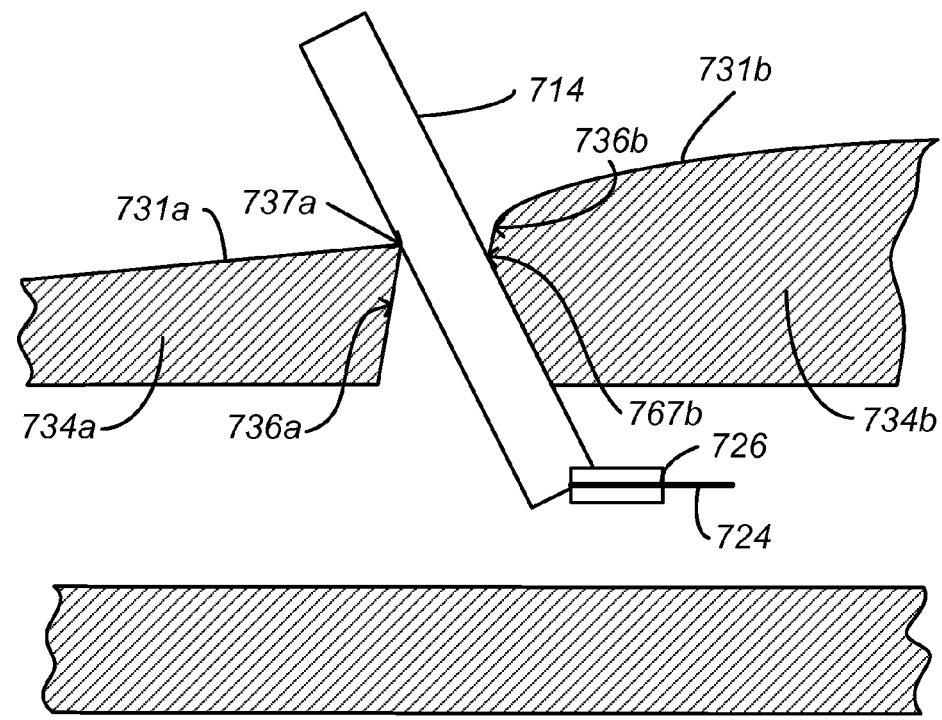

FIGS. 7A and 7B shows cross-sectional side views of a rotatable connector 714 that pivots about edges of an outer shell 734 having the edges at different heights according to an embodiment of the present invention.

In FIG. 7A, connector 714 is shown fully rotated backward (clockwise as shown). Connector 714 is in contact with an edge 737b, as well as a surface section 736b, which is above edge 737b. Having surface section 736b allows a surface 731b to be higher, and also provides a greater surface area for stopping a rotation of connector 714, which can reduce the wear and tear on edge 737b. In particular, if the upright position is the most frequent position of operation, such durability is more important than the fully forward (counterclockwise) position.

To provide a more regular slope from surface 731b to a surface 731a, an edge 737a of section 734a of the outer shell can be at a higher height than edge 737b. As shown, the trend from surface 731b to surface 731a is a downward slope. Having a higher edge 737a can not only provide a consistent slope from surface 731b to surface 731a, but also can allow section 734 to be thicker and stronger where it contacts and resists movement of connector 714.

In another embodiment, a surface 736a may also have an upper section above edge 737a, in a similar orientation as surface 736b. As mentioned above, the upper portion of surface 736a can also provide for greater durability, and also allow for a thicker and stronger surface 734a.

In FIG. 7B, connector 714 is shown fully rotated forward (counterclockwise as shown). Connector 714 is stopped in the rotation by a lower section of surface 736b that is below edge 737b and stopped by edge 737a. In one aspect, connector 714 could rotate further forward, if edge 737b were lowered in the vertical direction or moved farther from edge 737b.

Having a consistent slope from surface 731b to surface 731a can also give the docking station relatively more weight towards the back of the docking station, as the base of the docking station would be thicker towards the back. Since more weight would be toward the back, if there is enough force on the connector in the forward direction, the docking station can then (by design) tip over so that all of the force does not remain on the connector, which might otherwise break the connector.

Some embodiments can also prevent the rotatable connector from breaking by helping the connector to be removed (ejected) from the portable electronic device when the connector is rotated too far. In this manner, the connector will no longer experience the force from a portable electronic device that has been rotated too far, since the portable electronic device will no longer be coupled to the connector. In some embodiments, this ejection can be accomplished by retracting at least a portion of the connector into the body of the docking station.

Figure 8A:
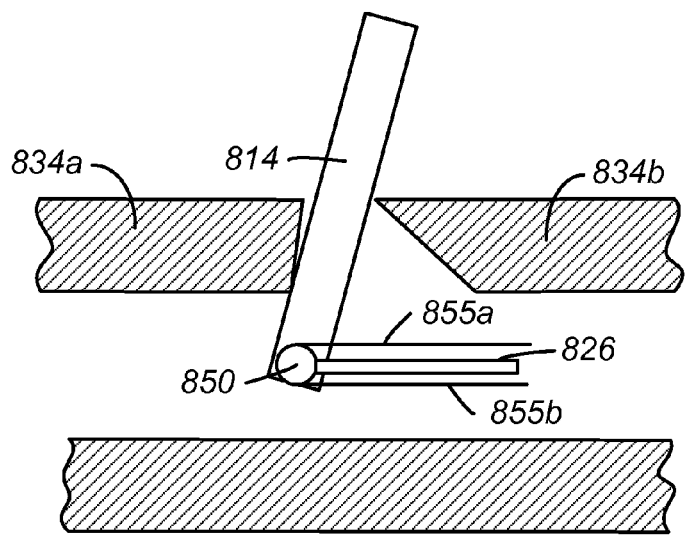
FIGS. 8A-8C show cross-sectional side views of a rotatable connector that retracts into the docking station during rotation according to an embodiment of the present invention.
Figure 8B:
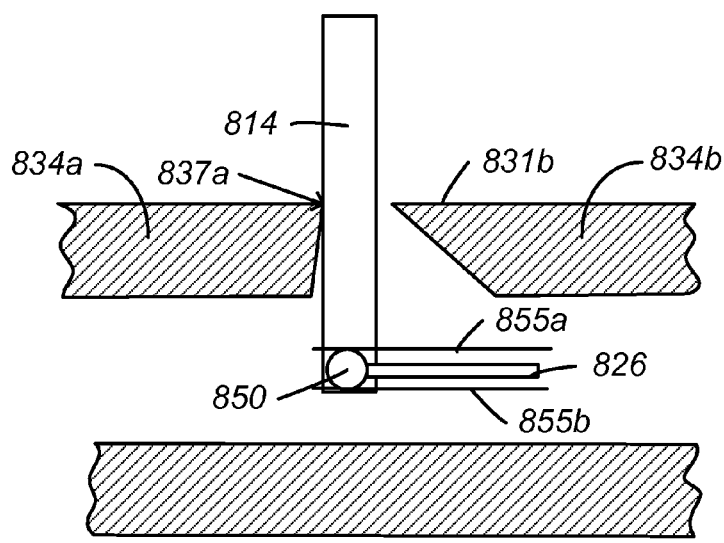
Figure 8C:
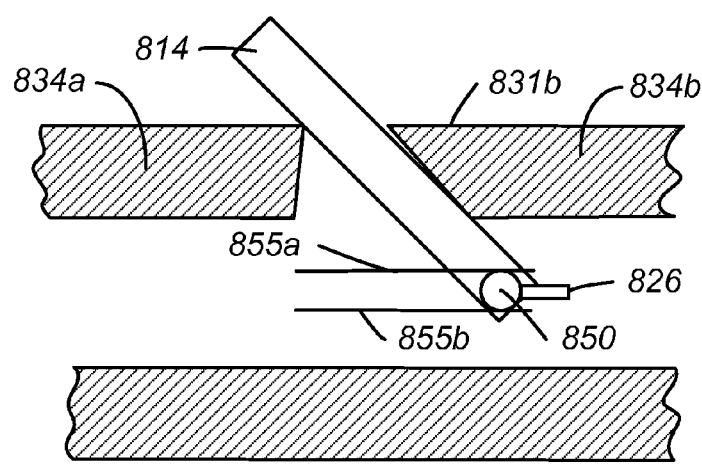

FIGS. 8A-8C show cross-sectional side views of a rotatable connector 814 that retracts into the docking station during rotation according to an embodiment of the present invention.

FIG. 8A shows the connector fully rotated backward (clockwise) into an upright position, e.g., where a connected portable electronic device can be received by a rear reference surface (not shown) of the docking station. A guide post 850 is coupled to or formed as part of the connector 814. For example, cylindrical rods may be attached to side edges of connector 814. In other embodiments, the guideposts may be rectangular, oblong, or any other suitable geometric shape. A biasing mechanism 826 is used as in other embodiments to bias connector 814 into an upright position.

Guide planes 855 (composed of two surfaces 855a and 855b in this embodiment) can guide the motion of the guidepost 850 as connector 814 rotates. This guiding of the motion of the bottom or other part of connector 814 can provide a retraction motion during rotation. Although guide planes 855 are shown parallel and horizontal, other shapes and orientations may be used. For example, the bottom guide plane 855b may have the same shape as the supporting surface 455 of FIGS. 4A and 4B.

Guide post 850 and the guiding surfaces 855 may provide a retraction mechanism that retracts connector 814 as it rotates away from the vertical. Guide post 850 and guiding surfaces 855 may also be or be part of a rotation mechanism that allows connector 814 to rotate. Outer shell sections 834a and 834b or just parts of outer shell sections 834a and 834b (such as edges and surfaces) may also be part of the rotation mechanism.

FIG. 8B shows connector 814 rotated to a more vertical orientation. In this position, connector 814 is shown as contacting an edge 837a of the section 834a of the outer shell. In one aspect, this position of connector 814 may occur when connector 814 has been rotated forward. When moving backward from this position, connector 814 may contact and pivot about an edge of the section 834b of the outer shell.

In FIG. 8B, the portion of connector 814 extending above a top surface 831b of the outer shell has increased relative to the position shown in FIG. 8A. This is because the distance from the bottom guide plane 855b to the surface 831b along connector 814, is shorter than in FIG. 8A. The distance is shorter because the connector is more vertical.

Since the portion of connector 814 below top surface 831b is smaller, more of the connector is above surface 831b. Thus, the bottom guide plane 855b can push up connector 814 by keeping the guidepost 850 at the same height. However, as connector 814 rotates forward (counterclockwise) beyond the vertical, more of connector 814 will be below top surface 831b, and less will be above. This motion effectively retracts connector 814.

FIG. 8C shows connector 814 fully rotated forward (counterclockwise as shown). As connector 814 rotates forward, guidepost 850 moves backward (to the right as drawn), and the angle of connector 814 from the vertical increases. Since guide plane 855a prevents guidepost 850 from moving closer to surface 831b, the portion of connector 814 below surface 831b increases. As the portion of connector 814 below the top surface 8831b increases, the portion above the top surface 831b decreases, which causes a retraction of connector 814.

In other words, once connector 814 is rotated past the vertical, the connector 814 is pulled by guide plane 855a farther into the body of the docking station. If a small enough portion of connector 814 is above top surface 831b, connector 814 is not able to remain coupled with the portable electronic device, and thus connector 814 can be ejected from the portable electronic device.

Such ejection may be helpful in embodiments where the connector cannot rotate all the way to being horizontal in the forward direction. In such situations, when the connector is fully rotated forward, the connector is vulnerable to breaking by a continuing force in the forward direction. The embodiments of FIGS. 8A-8C can prevent connector 814 from being continually pushed forward by promoting the ejection (disengaging) of connector 814 from the portable device prior to connector 814 reaching the position of full rotation forward.

Embodiments described herein provide docking stations with a connector that couples with a portable electronic device. A connector can move (e.g. rotate) when a forward force is applied, which helps to prevent the connector from breaking. In some embodiments, a biasing mechanism may be used to keep the connector in an upright position. A rear reference surface can be provided to support the electronic device with the connector in the upright position. Additionally, in some embodiments, the connector may retract into the body when rotated forward, thereby promoting ejection from a connected device before strain damages the connector.

In some embodiments, an edge of an outer shell of the dock can act as a pivot for the connector. In such embodiments, the opening through which the connector extends can be smaller, reducing a likelihood of debris falling inside the dock.

The specific details of particular embodiments may be combined in any suitable manner or varied from those shown and described herein without departing from the spirit and scope of embodiments of the invention. Moreover, the invention may also provide other features of docking stations, such as speakers, a video screen computers, and charging mechanisms.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A docking station for a portable electronic device, the docking station comprising:
    a base;
    a rotatable connector coupled to the base and biased toward an upright position, the rotatable connector configured to receive and electrically couple to a receptacle connector of the portable electronic device;
    a rear reference surface mechanically coupled to the base and adapted to support the portable electronic device when the electronic device is coupled to the rotatable connector in its upright position;
    a biasing mechanism that biases the rotatable connector to reside in the upright position, wherein the biasing mechanism includes at least one spring that provides a biasing force that increases as the rotatable connector moves farther form the upright position; and
    electronic circuitry electronically coupled with contacts of the rotatable connector, wherein the at least one spring includes a flexible circuit that electrically couples the rotatable connector with the electronic circuitry.

2. The docking station of claim 1, wherein a length of the at least one spring reduces when the rotatable connector rotates away from the upright position.

3. The docking station of claim 1, wherein during rotation, the rotatable connector pivots at a point above an external surface of the base.

4. The docking station of claim 1, wherein the base includes an outer shell, and wherein during rotation, the rotatable connector pivots at the outer shell.

5. A docking station for a portable electronic device, the docking station comprising:
    a base including an outer shell having an opening; and
    a rotatable connector coupled to the base and protruding through the opening in the outer shell of the base, the rotatable connector having a first section below the outer shell and a second section above the outer shell, wherein the rotatable connector is configured to receive and electrically couple to a receptacle connector of the portable electronic device,
    wherein during at least a portion of a rotation, the rotatable connector pivots about a point of contact between a surface of the rotatable connector and the outer shell, and wherein a bottom end of the first section and a top end of the second section of the rotatable connector move when the rotatable connector pivots about the point of contact.

6. The docking station of claim 5, wherein the outer shell includes:
    a first section on a first side of the opening, the first section including a first edge, wherein the rotatable connector pivots at the first edge when the rotatable connector rotates in a first direction; and
    a second section on the opposite side of the opening, the second section including a second edge, wherein the rotatable connector pivots at the second edge when the rotatable connector rotates in the opposite direction.

7. The docking station of claim 6, wherein the first edge is at a same height as the second edge.

8. The docking station of claim 6, a biasing mechanism that is coupled to a section of the connector beneath the outer shell and that biases the rotatable connector toward an upright position, wherein the rotatable connector forms a seal in the opening of the outer shell of the base when the rotatable connector is in the upright position, wherein the seal is formed by the rotatable connector contacting the first edge and contacting the second section.

9. The docking station of claim 6, wherein the first section of the outer shell includes a first surface facing towards the rotatable connector, the first surface being below the first edge and angling away from the rotatable connector when the rotatable connector is in a vertical position and
    wherein the second section of the outer shell includes a second surface facing towards the rotatable connector, the second surface being below the second edge and angling away from the rotatable connector when the rotatable connector is in the vertical position.

10. The docking station of claim 9, wherein the rotatable connector contacts the first edge when the rotatable connector is in an upright position, wherein the angle of the first surface below the first edge is greater than the angle of the second surface below the second edge.

11. The docking station of claim 9, wherein a part of the first surface above the first edge also angles away from the rotatable connector when the rotatable connector is in the vertical position.

12. The docking station of claim 5, wherein the rotatable connector includes at least one curved part at a bottom of the rotatable connector, and further comprising:
    at least one guiding surface that is in contact with the at least one curved part and that guides a position of the rotatable connector during rotation.

13. The docking station of claim 12, wherein the at least one guiding surface includes detents that stabilize the rotatable connector in one or more upright positions.

14. The docking station of claim 5, further comprising:
    a biasing mechanism that is coupled to a section of the connector beneath the outer shell and that biases the rotatable connector toward an upright position.

15. The docking station of claim 14, further comprising:
electronic circuitry; and
an electrical connection between the rotatable connector and the electronic circuitry, wherein the biasing mechanism includes:
a first spring coupled with the rotatable connector at a first edge on a first side of the electrical connection; and
a second spring coupled with the rotatable connector at a second edge on a second side of the electrical connection.

16. A docking station for a portable electronic device, the docking station comprising:
a base having an outer shell, the outer shell having an opening;
a rotatable connector that protrudes through the opening in the outer shell, the rotatable connector having a first section below the outer shell and a second section above the outer shell, wherein the rotatable connector is configured to receive and electrically couple to a receptacle connector of the portable electronic device;
at least one guide post coupled with the first section of the rotatable connector; and
at least one guiding surface that is in contact with the at least one guide post and that guides a position of the rotatable connector during rotation, wherein the at least one guide post moves along the at least one guiding surface during rotation.

17. The docking station of claim 16, wherein the at least one guiding surface includes:
a first guiding surface below the at least one guide post, the first guiding surface providing a force upwards on the rotatable connector when the rotatable connector rotates toward a vertical position; and
a second guiding surface above the at least one guide post, the second guiding surface providing a force downwards on the rotatable connector when the rotatable connector rotates toward a horizontal position.

18. The docking station of claim 17, further comprising:
a biasing mechanism in contact with the at least one guide posts, wherein the biasing mechanism provides a biasing force in a direction to rotate the rotatable connector toward an upright position.

19. The docking station of claim 18, wherein the biasing mechanism includes:
one or more springs that reside between the first guiding surface and the second guiding surface.

20. The docking station of claim 16, wherein the at least one guide post is coupled with a bottom end of the first section of the rotatable connector.

21. The docking station of claim 16, wherein the at least one guiding surface includes detents that stabilize the rotatable connector in one or more upright positions.

22. The docking station of claim 16, further comprising a flexible circuit electrically coupling the rotatable connector with electronic circuit in the docking station, wherein the flexible electrical circuit acts as a biasing mechanism that biases the rotatable connector towards an upright position.

23. A docking station for a portable electronic device, the docking station comprising:
a base having a bottom surface and a top outer shell, the top outer shell having an opening;
a rotatable connector that protrudes through an opening in the top outer shell, the rotatable connector having a first section below the top outer shell and a second section above the top outer shell, wherein the rotatable connector is configured to receive and electrically couple to a receptacle connector of the portable electronic device; and
a retraction mechanism that causes the second section of the rotatable connector that is above the outer shell to decrease as the second section of the rotatable connector rotates from a position perpendicular to the bottom surface towards a front of the docking station, wherein a bottom end of the first section of the rotatable connector moves toward a back of the docking station as the second section of the rotatable connector rotates towards the front of the docking station.

24. The docking station of claim 23, wherein the retraction mechanism ejects the rotatable connector from the receptacle connector of the portable electronic device when the rotatable connector is rotated forward towards the front of the docking station.

* * * * *